(12) United States Patent
Carlyle et al.

(10) Patent No.: US 9,975,014 B2
(45) Date of Patent: *May 22, 2018

(54) GOLF CLUB HEAD

(71) Applicant: SRI SPORTS LIMITED, Kobe-shi, Hyogo (JP)

(72) Inventors: Scott A. Carlyle, Costa Mesa, CA (US); Sharon J. Park, Irvine, CA (US); Brian D. Schielke, Los Angeles, CA (US)

(73) Assignee: SRI SPORTS LIMITED, Kobe (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/371,879

(22) Filed: Dec. 7, 2016

(65) Prior Publication Data
US 2017/0087424 A1 Mar. 30, 2017

Related U.S. Application Data

(63) Continuation of application No. 14/857,386, filed on Sep. 17, 2015, now Pat. No. 9,555,298, which is a
(Continued)

(51) Int. Cl.
*A63B 53/04* (2015.01)
*B23K 26/359* (2014.01)
*B23K 26/364* (2014.01)

(52) U.S. Cl.
CPC .......... *A63B 53/047* (2013.01); *A63B 53/04* (2013.01); *B23K 26/359* (2015.10); *B23K 26/364* (2015.10); *A63B 2053/0445* (2013.01)

(58) Field of Classification Search
CPC ............ A63B 2053/0445; A63B 53/04; A63B 53/047
(Continued)

(56) References Cited

U.S. PATENT DOCUMENTS 5,451,056 A 9/1995 Manning
5,800,285 A 9/1998 Thorne et al.
(Continued)

OTHER PUBLICATIONS

Cleveland Golf CG15 Black Pearl wedge, Oct. 13, 2009, http://www.clevelandgolf.com/US_cg15-black-pearl_CG15BP_viewProd_wedges.html (obtained Aug. 22, 2011).
(Continued)

*Primary Examiner* — Benjamin Layno
(74) *Attorney, Agent, or Firm* — Oliff PLC

(57) ABSTRACT

A golf club head has a striking face with a plurality of scorelines including a first scoreline and a second scoreline adjacent thereto. The striking face also has a plurality of auxiliary grooves each spaced from the scorelines. In a first imaginary vertical plane, a first path is formed by a first intersection between the first imaginary vertical plane and the striking face, and the auxiliary grooves have a first concentration no less than 0.17 measured between the first and second scorelines. A second imaginary vertical plane is horizontally spaced from the first imaginary plane. A second path is formed in the second imaginary vertical plane by a second intersection between the second imaginary vertical plane and the striking face. The auxiliary grooves in the second imaginary vertical plane have a second concentration that is different from the first concentration measured between the first and second scorelines.

20 Claims, 11 Drawing Sheets

Related U.S. Application Data continuation of application No. 14/175,763, filed on Feb. 7, 2014, now Pat. No. 9,162,116, which is a continuation of application No. 13/215,917, filed on Aug. 23, 2011, now Pat. No. 8,684,861.

(58) Field of Classification Search
USPC .................................................. 473/331, 330
See application file for complete search history.

(56) References Cited

U.S. PATENT DOCUMENTS

| | | |
|---|---|---|
| 6,198,066 B1 | 3/2001 | Thorne |
| 6,475,099 B1 | 11/2002 | Sumitomo et al. |
| 6,710,287 B2 | 3/2004 | Lu |
| 6,713,717 B2 | 3/2004 | Takeda |
| 6,719,644 B2 | 4/2004 | Beach |
| 7,278,928 B2 | 10/2007 | Newman et al. |
| 7,445,561 B2 | 11/2008 | Newman et al. |
| 7,491,131 B2 | 2/2009 | Vinton |
| 7,520,045 B2 | 4/2009 | Lo |
| 7,594,863 B2 | 9/2009 | Ban |
| 8,506,420 B2 | 8/2013 | Hocknell et al. |
| 8,684,861 B2 | 4/2014 | Carlyle et al. |
| 9,162,116 B2 | 10/2015 | Carlyle et al. |
| 2002/0091014 A1 | 7/2002 | Aldrich |
| 2005/0113186 A1 | 5/2005 | Newman et al. |
| 2007/0167249 A1 | 7/2007 | Voges et al. |
| 2007/0173346 A1 | 7/2007 | Chiang et al. |
| 2008/0051212 A1 | 2/2008 | Voges |
| 2008/0125241 A1 | 5/2008 | Tateno et al. |
| 2008/0125242 A1* | 5/2008 | Ban .................. A63B 53/047 473/331 |
| 2008/0207349 A1 | 8/2008 | Gilbert et al. |
| 2008/0307631 A1 | 12/2008 | Lin et al. |
| 2009/0176597 A1 | 7/2009 | Yamagishi et al. |
| 2009/0313806 A1 | 12/2009 | Gilbert |
| 2009/0318243 A1 | 12/2009 | Golden et al. |
| 2010/0029401 A1 | 2/2010 | Nakamura |
| 2010/0261545 A1 | 10/2010 | Ban |
| 2010/0285898 A1 | 11/2010 | Gilbert et al. |
| 2011/0269567 A1 | 11/2011 | Ban et al. |
| 2012/0264537 A1 | 10/2012 | Breier et al. |

OTHER PUBLICATIONS

Nike VR Pro Wedge, Oct. 19, 2010, http://www.nike.com/nikeos/p/nikegolf/en_US/products/details?sku=GW0320 (obtained Aug. 22, 2011).

Apr. 22, 2016 Office Action issued in U.S. Appl. No. 14/857,386.

* cited by examiner

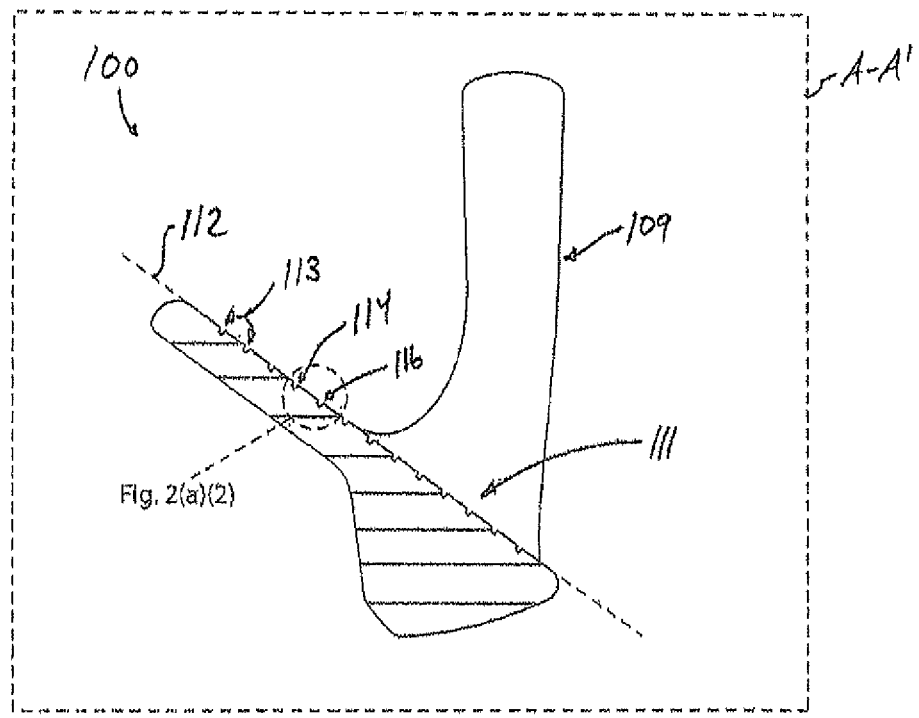
FIG. 2(a)(1)
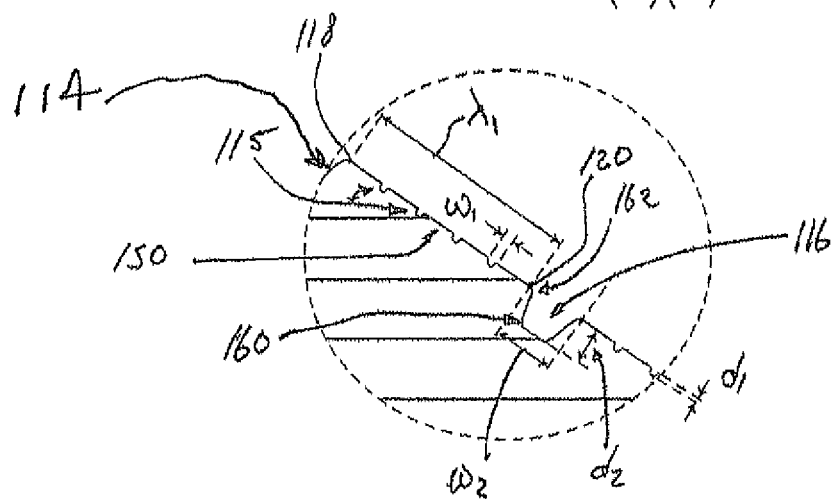
FIG. 2(a)(2)

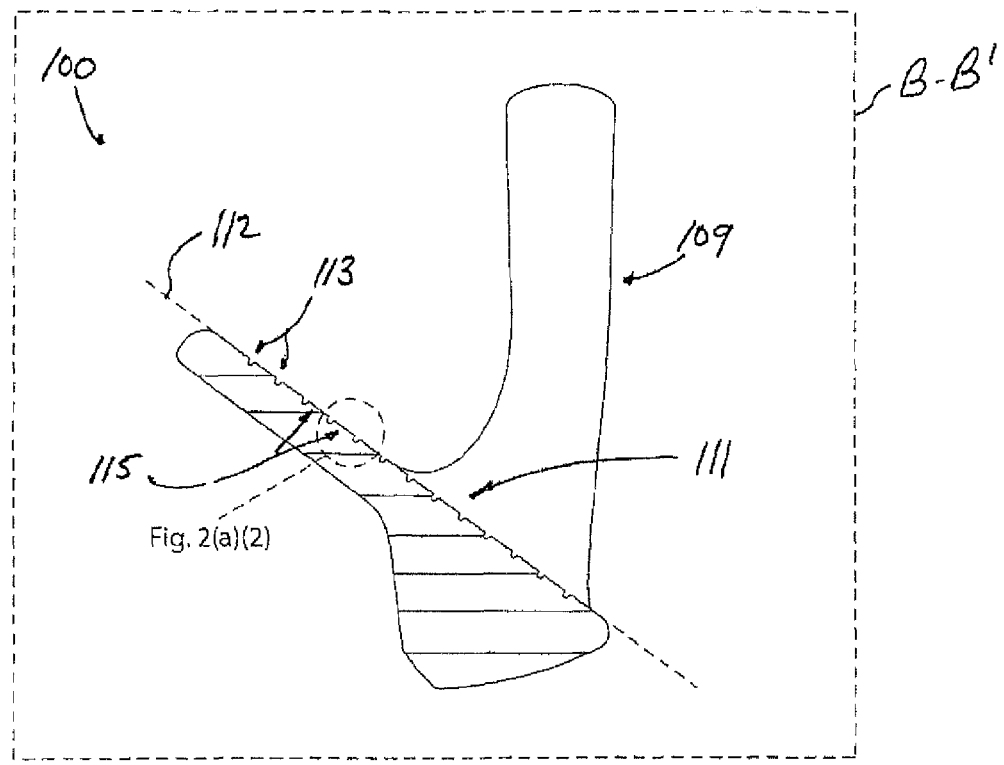
FIG. 2(b)(1)
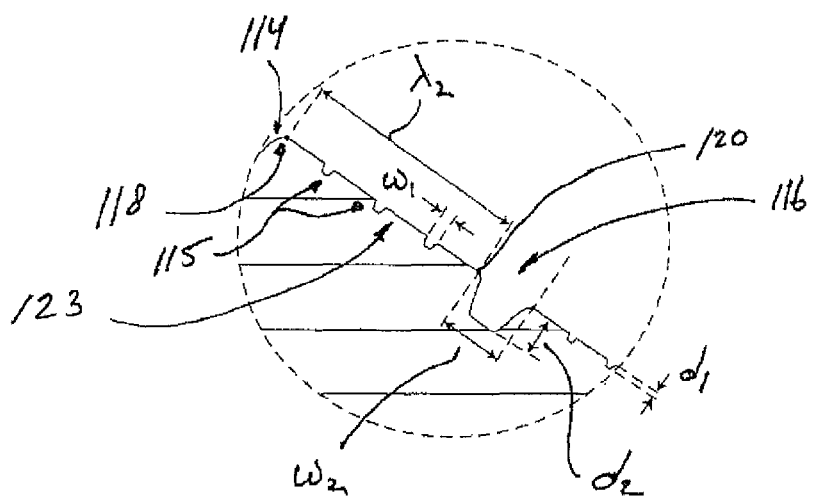
FIG. 2(b)(2)

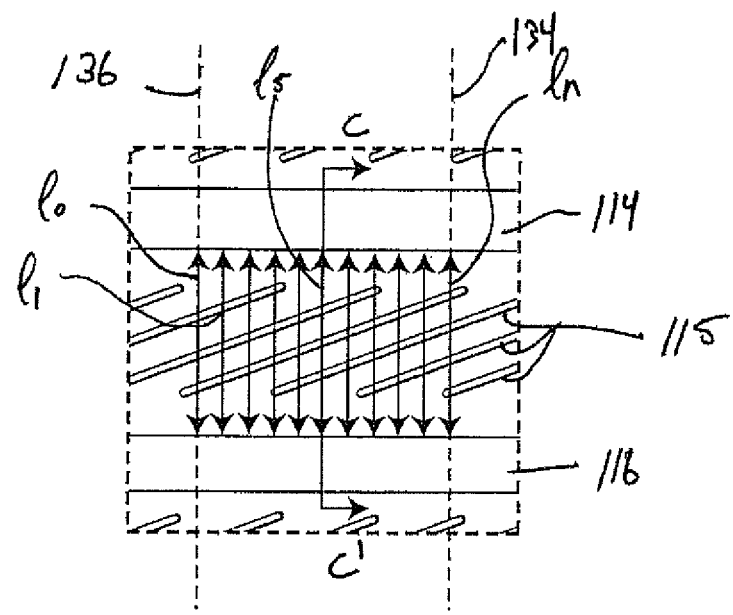
FIG. 3(b)
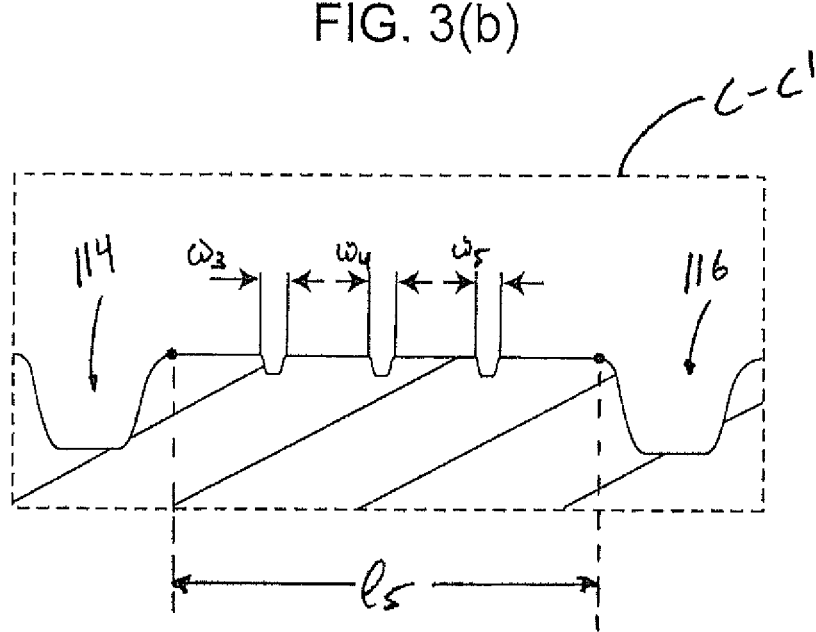
FIG. 3(b)(1)

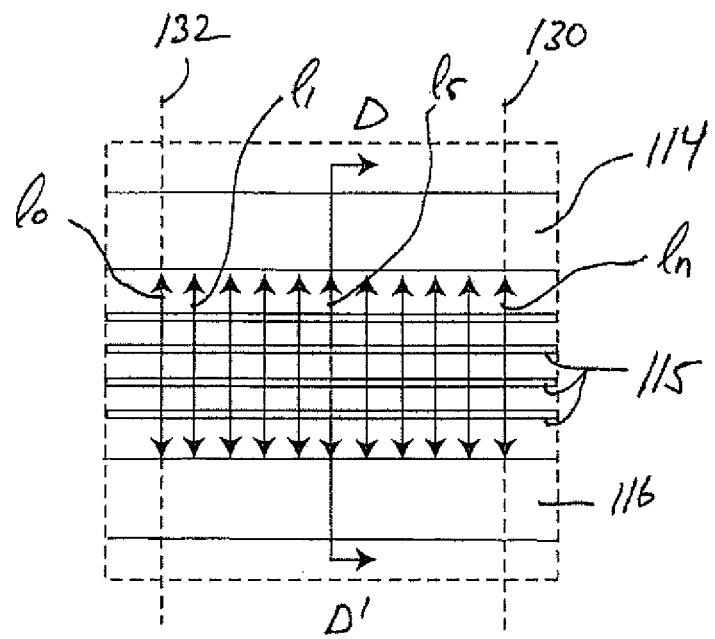
FIG. 3(c)
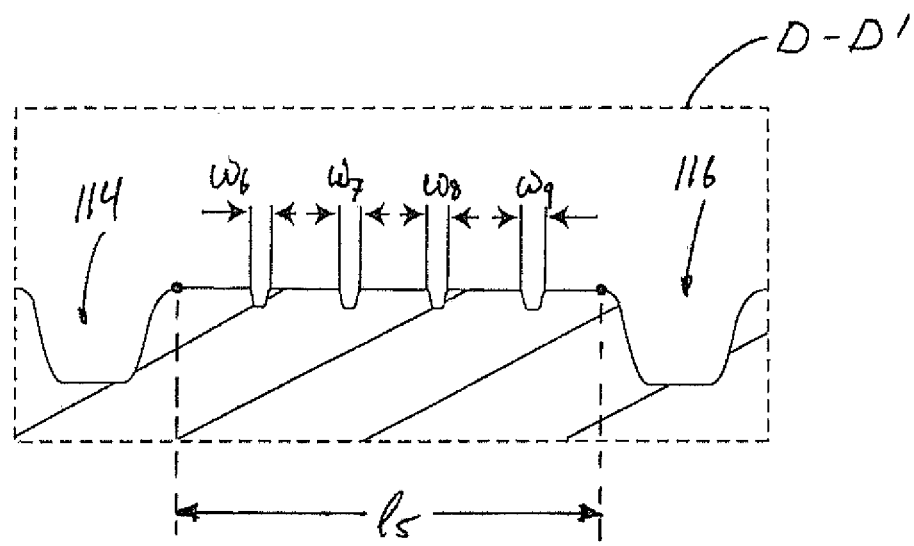
FIG. 3(c)(1)

GOLF CLUB HEAD

This application is a continuation of U.S. application Ser. No. 14/857,386, filed Sep. 17, 2015, which is a continuation of U.S. application Ser. No. 14/175,763, filed Feb. 7, 2014 (now U.S. Pat. No. 9,162,116 B2 issued Oct. 20, 2015), which is a continuation of U.S. application Ser. No. 13/215,917, filed Aug. 23, 2011 (now U.S. Pat. No. 8,684,861 B2 issued Apr. 1, 2014). The prior application, including the specification, drawings and abstract are incorporated herein by reference in its entirety.

COPYRIGHT AUTHORIZATION

The disclosure below may be subject to copyright protection. The copyright owner has no objection to the facsimile reproduction by anyone of the documents contained in this disclosure as they appear in the Patent and Trademark Office records, but otherwise reserves all applicable copyrights.

BACKGROUND OF THE INVENTION

A common desire in golf club manufacturing is to produce a club head having a striking face that imparts significant spin on a hit ball. Specifically, iron-type and utility-type golf club heads generally include a striking face having a plurality of grooves, or scorelines thereon. Such scorelines assist in imparting spin to a golf ball at least by channeling water and debris and improving traction between the striking face and the golf ball. However, the ability of scorelines to increase spin on a hit golf ball is limited in part by USGA regulation governing scoreline geometry. In addition, conventional scorelines fail to account for low-scale dynamic interaction characteristics between the striking face and the golf ball.

To further improve the ability of the striking face to impart spin, conventional club heads have included low-scale surface textures in addition to, or in place of, scorelines. However, such surface textures tend not to be tailored to the specific interaction between an elastomeric-coated golf ball and a metallic striking face. Further, conventional surface texturing is subject to rapid wear and costly to produce.

Also, common striking face surface textures are generally ineffective at enabling high spin for each of a variety of golf shot types that a golfer may attempt. For example, a golf ball hit by a golfer using a conventional club head with a specified swing speed would generally have a reduced ball spin if the golfer were to attempt a shot with the club face open, i.e. a "flop shot," as compared with a typical golf shot with the club head squarely addressed.

SUMMARY

Certain embodiments of the present invention, in one or more aspects thereof, may advantageously comprise a golf club head that delivers improved spin production, increased player confidence, and increased playability of the golf club.

According to various embodiments, a golf club head comprises a striking face having: a plurality of scorelines including a first scoreline and a second scoreline adjacent to the first scoreline, and a plurality of auxiliary grooves each spaced from the plurality of scorelines. When the club head is in a reference position, in a first imaginary vertical plane generally perpendicular to the striking face and passing through the first and second scorelines, a first path is formed by a first intersection between the first imaginary vertical plane and the striking face. The plurality of auxiliary grooves has a first concentration no less than 0.17 measured between the first scoreline and the second scoreline. In a second imaginary vertical plane generally perpendicular to the striking face and passing through the first and second scorelines, the second imaginary vertical plane being horizontally spaced from the first imaginary plane, a second path is formed by a second intersection between the second imaginary vertical plane and the striking face, and the plurality of auxiliary grooves has a second concentration measured between the first scoreline and the second scoreline. The second concentration is different from the first concentration.

According to various embodiments, a golf club head, when oriented in a reference position, comprises a top portion, and a bottom portion opposite the top portion, a heel portion, and a toe portion opposite the heel portion, a hosel extending from the heel portion, and a striking face. The striking face has a plurality of scorelines including a first scoreline and a second scoreline adjacent to the first scoreline, and a plurality of texture elements, each spaced from the plurality of scorelines. A first and a second imaginary vertical plane, each generally perpendicular to the striking face, and each passing through the first and the second scorelines, are horizontally spaced from each other by 10 mm. A third and a fourth imaginary vertical plane, each generally perpendicular to the striking face, and each passing through the first and the second scorelines, are each located toeward of both the first and the second imaginary vertical planes, and are horizontally spaced from each other by 10 mm. A first region is delimited by the first imaginary plane and the second imaginary plane, and, in the first region, the plurality of texture elements has an average concentration, $C_1$, measured between the first and the second scorelines. A second region is delimited by the third imaginary plane and the fourth imaginary plane, and, in the second region, the plurality of texture elements has an average concentration, $C_2$, measured between the first and the second scorelines. A ratio, $C_2/C_1$, is no greater than 0.85.

According to various embodiments, a golf club head when oriented in a reference position relative to a ground plane comprises a heel portion and a toe portion opposite the heel portion, a hosel extending from the heel portion, and a striking face. The striking face has a striking face plane, a face center, a central region including the face center, a peripheral region outward of the central region, and a plurality of scorelines that include at least a first scoreline and a second scoreline adjacent the first scoreline. The plurality of scorelines extending into the central region and the peripheral region. The striking face also has a plurality of auxiliary grooves at least partially interspersed within the plurality of scorelines. The plurality of auxiliary grooves extends into the central region and the peripheral region. In the central region, one or more of the plurality of auxiliary grooves follows a generally horizontal path relative to the ground plane, and the plurality of auxiliary grooves have an average concentration no less than 0.17 between the first scoreline and the second scoreline. In the peripheral region, one or more of the plurality of auxiliary grooves follows a non-horizontal path relative to the ground plane.

According to various embodiments, a golf club head, when oriented in a reference position relative to a ground plane, comprises a heel portion and a toe portion opposite the heel portion, a hosel extending from the heel portion, and a striking face. The striking face has a striking face plane, a plurality of scorelines having a heelwardmost extent, a toewardmost extent, and a width, W, being the horizontal distance between the heelwardmost extent and the toewardmost extent. The plurality of scorelines includes at least a first scoreline and a second scoreline adjacent the first scoreline. A plurality of auxiliary grooves is at least partially interspersed within the plurality of scorelines. A first imaginary vertical plane, perpendicular to the striking face plane, passes through the heelwardmost extent of the plurality of scorelines. A second imaginary vertical plane, parallel to the first imaginary vertical plane, passes through the toewardmost extent of the plurality of scorelines. A third imaginary vertical plane is parallel to the first imaginary vertical plane and equidistant between the first imaginary vertical plane and the second imaginary vertical plane. A fourth imaginary vertical plane is parallel to the first imaginary vertical plane and spaced from the third imaginary vertical plane toward the heelwardmost extent by a distance, D, that is between 0.10*W and 0.45*W. A fifth imaginary vertical plane is parallel to the first imaginary vertical plane and spaced from the third imaginary vertical plane toward the toewardmost extent by the distance D. A central region is delimited by the fourth and the fifth imaginary vertical planes. A heel region is delimited by the first and the fourth imaginary vertical planes. A toe region is delimited by the second and the fifth imaginary vertical planes. In the central region, one or more of the plurality of auxiliary grooves follows a generally horizontal path relative to the ground plane and the plurality of auxiliary grooves have a concentration no less than 0.17 measured between the first scoreline and the second scoreline. Further, in at least one of the heel region and the toe region, one or more of the plurality of auxiliary grooves follows a non-horizontal path relative to the ground plane.

These and other features and advantages of the golf club head according to the invention in its various aspects, as provided by one or more of the various examples described in detail below, will become apparent after consideration of the ensuing description, the accompanying drawings, and the appended claims. The accompanying drawings are for illustrative purposes only and are not intended to limit the scope of the present invention.

BRIEF DESCRIPTION OF THE DRAWINGS

The present invention, in one or more aspects thereof, is illustrated by way of example and not by way of limitation, in the figures of the accompanying drawings, where:

FIG. 2(a)(1) is a toe-side cross-sectional view in an imaginary plane A-A' of FIG. 2;

FIG. 2(a)(2) is a toe-side enhanced cross-sectional view in the imaginary plane A-A' of FIG. 2;

FIG. 2(b)(1) is a toe-side cross-sectional view in an imaginary plane B-B' of FIG. 2;

FIG. 2(b)(2) is a toe-side enhanced cross-sectional view in the imaginary plane B-B' of FIG. 2;

FIG. 3(b) is a detail view of a portion of the golf club head of FIG. 3(a);

FIG. 3(b)(1) is a toe-side cross-sectional view in an imaginary place C-C' of FIG. 3 (b);

FIG. 3 (c) is a detail view of a portion of the golf club head of FIG. 3(a);

FIG. 3(c)(1) is a toe-side cross-sectional view in an imaginary plane D-D' of FIG. 3(c);

For purposes of illustration, these figures are not necessarily drawn to scale. In all the figures, same or similar elements are designated by the same reference numerals.

DETAILED DESCRIPTION

Figure 1:
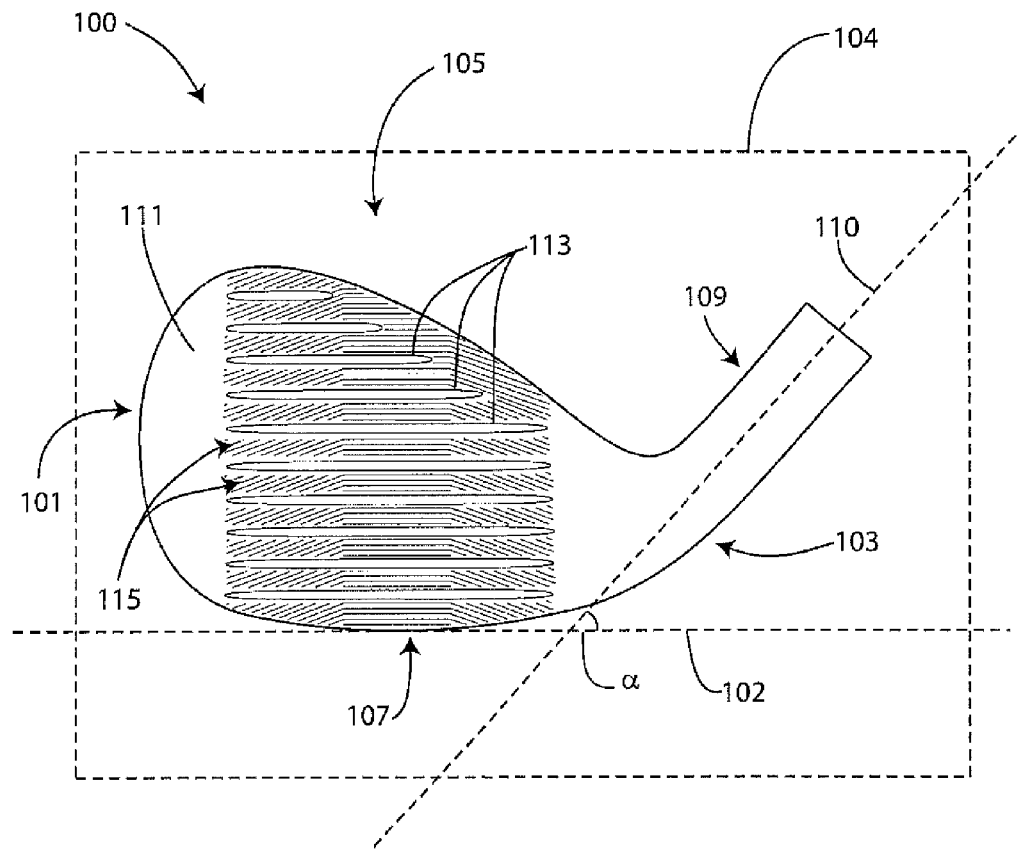
FIG. 1 is a front elevation view of a golf club head according to various embodiments.

Representative examples of one or more novel and nonobvious aspects and features of the golf club head according to the present invention, disclosed below, are not intended to be limiting in any manner. Furthermore, the various aspects and features of the present invention may be used alone or in a variety of novel and nonobvious combinations and subcombinations with one another.

Iron-type and utility-type golf club heads generally include a striking face that interfaces with and strikes a golf ball. A plurality of grooves, or scorelines, is provided on the striking face to assist in imparting spin to the golf ball. A portion of the face may have an area with a different type of surface treatment that extends beyond the scoreline extents. Conventionally, the orientation of the scorelines is such that spin is maximized when the striking face squarely impacts the golf ball with respect to a target line. However, when the orientation of the striking face deviates from the target line, e.g. when a golfer attempts a "flop shot" by opening the face of the club head, spin production and playability are reduced.

The striking face is selectively textured to enhance playability. The face point of contact with the ball, as well as the orientation and location of a contact path, varies depending upon the particular golf shot being performed. If the ball is laying on the fairway and the golfer takes a "regular" swing, then the golfer strives to make contact with the ball on the lower portion of the club face, typically the lower, central portion of the club face. In such cases, the resulting ball contact path along the striking face is substantially vertical and centered on the striking face, when the club head is viewed in a reference position relative to a ground plane, as defined below. For a flop shot, the golfer opens the club face to a large degree, which would result in a different contact point location and angular orientation. Still other portions of the face may be used for other types of shots; for example, some golfers use the extreme outer toe portion of the face, with the toe pointed toward the playing surface, as the ball contact point for chip shots. The face may therefore be variably textured to enhance each of the different types of shots the golfer may perform.

The United States Golf Association (USGA) publishes and maintains the Rules of Golf, which govern golf in the United States. Appendix II to the USGA Rules provides several limitations for golf clubs. For example, currently, the width of a groove cannot exceed 0.035 inch, the depth of a groove cannot exceed 0.020 inch, and the surface roughness within the area where impact is intended must not exceed that of decorative sand-blasting or of fine milling. The Royal and Ancient Golf Club of St Andrews, which is the governing authority for the rules of golf outside the United States, currently provides similar limitations to golf club design.

Certain embodiments of the present invention, in one or more aspects thereof, may advantageously comprise a golf club head that delivers improved spin production, increased player confidence, and increased playability of the golf club by way of incorporating a plurality of auxiliary grooves and/or texture elements into the striking face of the golf club head.

Figure 1A:
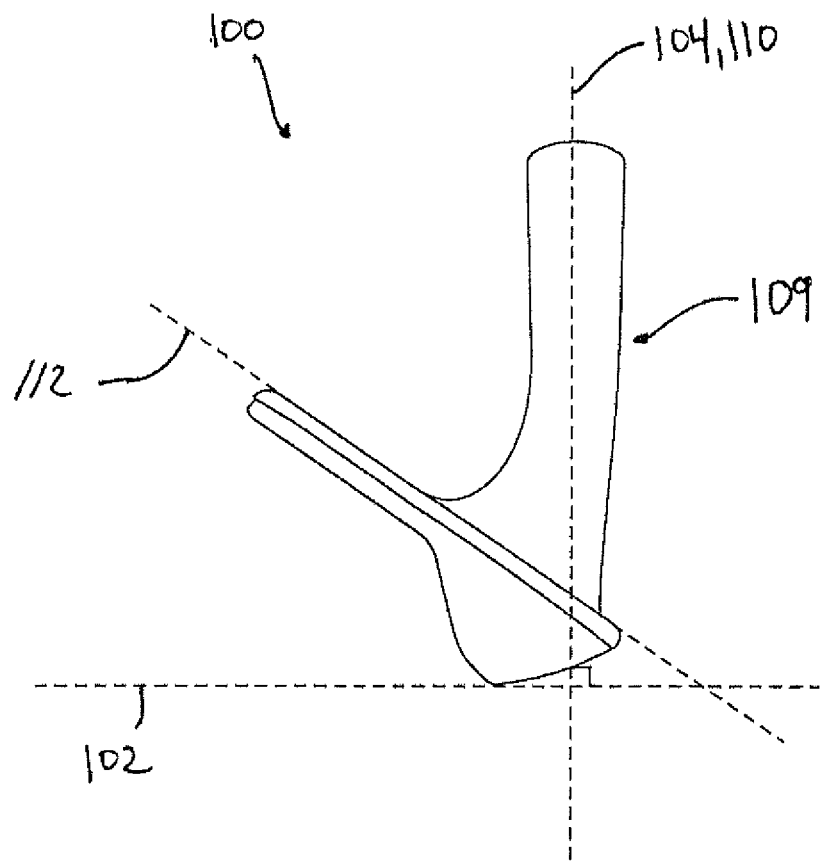
FIG. 1(a) is a toe-side elevation view thereof.

In one or more embodiments, and as depicted by way of example in FIGS. 1 through 1(a), a golf club head 100 comprises an iron-type golf club head. It is noted, however, that while the golf club head 100 is illustrated as an iron-type golf club head and is discussed with respect to conventional usage as a wedge, the golf club head 100 may be any of an iron-type, putter-type, wood-type, hybrid-type, etc. golf club head. It is further noted that while the golf club head 100 is illustrated as being a right-handed golf club head, any reference to any position on the golf club head 100 may be mirrored, and applied to a left-handed golf club head.

Referring to FIG. 1, the golf club head 100 has a toe portion 101, a heel portion 103, a top portion 105, a bottom portion 107, and a hosel 109 for receiving a shaft (not shown) that extends from golf club head proximate the heel portion 103. The hosel 109 has a hosel centerline 110 that extends through the center point of a diameter cross-section of the hosel 109. The hosel 109 may also generally take any shape or position with respect to the golf club head 100. While the figures of this application illustrate a golf club head 100 having a hosel 109, the golf club head 100 may simply have a shaft reception location, e.g., an aperture, in lieu of the illustrated hosel 109 and be "hosel-less."

The golf club head 100 also has a striking face 111 for striking a golf ball. The striking face 111 has a plurality of scorelines 113 and a plurality of auxiliary grooves 115 interspersed between the scorelines 113 and, in some embodiments, alternatively or additionally located outside of the region generally occupied by the scorelines 113. The plurality of scorelines 113 is provided on the striking face 111 to assist in imparting spin to a golf ball that contacts the striking face 111. The scorelines may be machined, e.g. by milling, optionally by spin-milling, or may be forged, stamped, rolled, pressed, or cast. In one or more embodiments, the plurality of auxiliary grooves 115 is a different type of surface treatment that extends between the scoreline extents. In some embodiments, the auxiliary grooves 115 vary in concentration and/or orientation between the scorelines 113 when traversing the striking face 111 from the toe portion 101 to the heel portion 103, and, additionally or alternatively, when traversing the striking face 111 the top portion 105 to the bottom portion 107. The striking face generally lies in an imaginary striking face plane 112 (see FIG. 1(a)). For example, the striking face 111 may be planar, textured, include scorelines, grooves, or have a slight curvature, e.g., a bulge and/or roll of a high radius of curvature.

Conventionally, the orientation of the scorelines 113 is such that spin is maximized when the striking face 111 squarely impacts the golf ball with respect to the reference position, or, in other words, the target line, during a "regular" shot. However, when the orientation of the striking face of a conventional golf club head that does not have any auxiliary grooves deviates from the reference position, spin production and playability are reduced.

The golf club head 100, as shown in FIG. 1, is in a reference position. As used herein, the term "reference position" refers to a position of the golf club head, e.g. club head 100, wherein the hosel centerline, e.g. hosel centerline 110, lies in an imaginary vertical hosel plane 104 relative to a ground plane 102, and the scorelines 113 generally extend parallel to the ground plane 102. Any reference to the terms horizontal or vertical, unless otherwise indicated, is in reference to a golf club head that is in the reference position relative to a ground plane.

In some embodiments, as shown for example in FIG. 1, the auxiliary grooves 115 vary in orientation and concentration across the striking face 111 to increase spin performance, and player confidence, when the golf club head 100 is oriented in a way that deviates from the reference position. The increase in spin production may be an overall increase in generated spin, and/or a reduction in an amount of spin lost between a golf club head 100 that does not include the auxiliary grooves 115 and one that does when each of these golf club heads 100 deviate from the reference position.

In one or more embodiments, the striking face 111 is polished, a nickel layer is applied, the striking face 111 is sandblasted, a second nickel layer is applied, and then the auxiliary grooves 115 are generated. This combination of processing steps and materials produces an aesthetically-pleasing contrast between auxiliary groove 115 coloring and the striking face 111. In some embodiments, the final nickel-coating process results in a dark, or black finish, further enhancing contrast. Further, such contrasts increase visibility of the auxiliary grooves and, in some embodiments, enhance a golfer's ability to align the club head with a golf ball.

Alternative or additional finishing processes may be applied to the striking face 111 of the club head 100, preferably prior to production of the auxiliary grooves 115. For example, the auxiliary grooves 115 may be superimposed on a striking face 111 that is micro-milled, media-blasted, chemically-etched, stamped, forged, laser-peened, unpolished, has other metal layers, rusted, not sandblasted, etc. Further embodiments may incorporate micro-surface texturing in combination with a substrate that is cast, milled, machined, forged, case-hardened, plated, media-blasted, anodized, etc. Any variation in materials, formation, surface texturing, layup, etc. may have an aesthetic effect that creates an appealing contrast with the auxiliary grooves 115, creates a moiré pattern that aids in alignment, creates a larger-scale roughness profile, aids in water/debris channeling, and may alter the performance and/or degree of feedback a player receives during a golf shot.

The auxiliary grooves 115, in one or more embodiments, are textured troughs generated by a high temperature laser that locally softens the surface of the striking face, creating a trough and generally roughened area surrounding the trough, otherwise known as "laser milling." In some embodiments, such laser milling heat treats the striking face 111 in the region to which it is applied, which results in a more durable surface, and tighter tolerances than mechanical milling/machining. Alternatively, or in addition to the laser milling, the auxiliary grooves 115 may be generated by way of chemical etching, media blasting, milling, micro-milling, cross-milling, stamping, etc.

Laser milling is relatively non-invasive. In other words, it is too shallow to negatively affect the structural integrity of striking face 111. As such, there is no need to thicken the striking face. Further, the laser milling manner generating the auxiliary grooves 115 generally avoids creation of stress concentrations, and is clean and precise. This precision results in minimal waste and cleanup when compared to other processes, such as machine-milling Thus, laser milling is cost-effective. Further, laser milling may be applied without interference with the structure of the scorelines 113 and, in some cases, does not require any significant after-polishing, thereby further effecting a high spin surface at a low cost with little machine wear.

The auxiliary grooves 115 change the color of the affected area of the striking face 111 creating appealing contrast. This contrast increases visibility of scorelines 113, and increases the ability of the golfer to properly align the golf club head 100 with a golf ball, thereby improving a player's perception of the golf club head 100 and increasing the player's confidence in his or her ability to make a successful golf shot.

Figure 2:
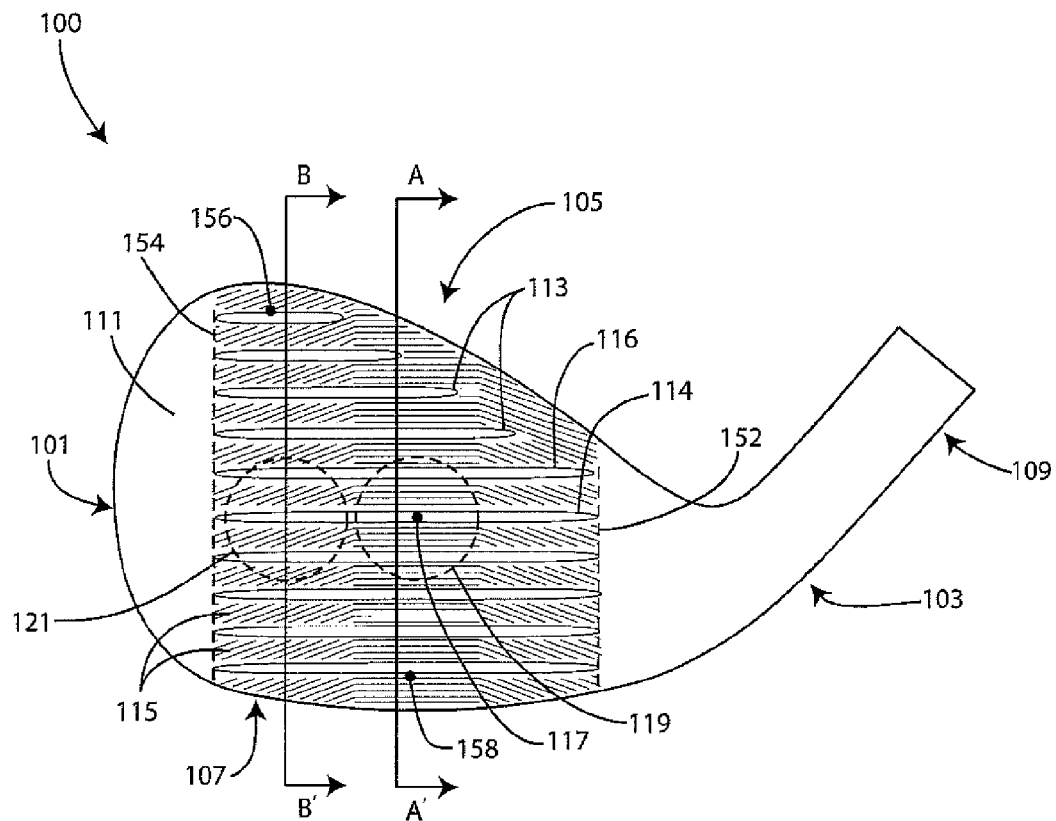
FIG. 2 is a front elevation view of the golf club head of FIG. 1 showing further detail.

Referring to FIG. 2, the club head 100 of FIG. 1 is shown in further detail. The striking face 111 includes a plurality of scorelines 113 and auxiliary grooves 115 that are interspersed between the scorelines 113. As discussed above, in some embodiments, the auxiliary grooves extend outward of the region generally occupied by the scorelines. The plurality of scorelines 113 includes a heelwardmost extent 152, a toewardmost extent 154, an uppermost extent 156, and a lowermost extent 158. The striking face 111 includes a face center 117. "Face center," as referred to herein, denotes a point on the striking face of a club head, halfway between the toewardmost extent 154 and the heelwardmost extent 152 of the plurality of scorelines 113, horizontally, and halfway between the uppermost extent 156 and the lowermost extent 158 of the plurality of scorelines 113, vertically.

Referring again to FIG. 2, the striking face 111 includes a continuous imaginary central region 119 that includes, and circumscribes, the face center 117. A peripheral region 121 is located entirely outward of the central region. In the central region 119, the auxiliary grooves 115 are generally horizontal. In the peripheral region 121, the auxiliary grooves 115 are inclined. Other variable orientations of the auxiliary grooves 115 may be realized such as a continuously-variable set of auxiliary grooves, for example a curved set of auxiliary grooves 115 that are similar in appearance to a milled face, discrete points (dots or dashes), or small, spaced-apart shapes that follow a pattern that generally varies in the heel-toe direction (see e.g. FIG. 5 discussed below). In various embodiments, the change in pattern is not gradual, but abrupt. Such variations in auxiliary groove 115 orientation results in specific performance advantages that will be discussed in more detail below.

As illustrated in FIGS. 1 and 2, proximate each of the heel and toe portions 103 and 101 of the golf club head 100, the auxiliary grooves 115 follow discrete linear paths that are approximately 15 degrees from horizontal, measured in the striking face plane 112. In some embodiments, the auxiliary grooves 115 proximate the heelward and toeward portions 103 and 101 follow discrete linear paths that are inclined 5-50 degrees from horizontal, measured in the striking face plane 112, when the club head 100 is in the reference position. Specifically, the auxiliary grooves proximate the toe portion 101 are inclined 5-50 degrees from the horizontal, while the auxiliary grooves proximate the heel portion 103 are declined from the horizontal. More preferably, and in consideration of minimizing, or eliminating, the potential for side spin to be imparted on the golf ball, the discrete linear paths are inclined between 5 and 20 degrees from horizontal, measured in the striking face plane, when the club head is in the reference position. The degree of incline or decline may be generally uniform proximate the toe portion 101 and/or the heel portion 103, or variable and, thus, based on the location on the striking face 111.

As shown in FIG. 2, the plurality of scorelines 113 is provided on the striking face 111 to assist in imparting spin to a golf ball that contacts the striking face 111. A first scoreline 114 and a second scoreline 116 of the plurality of scorelines 113 are illustrated. However, the first scoreline 114 and the second scoreline 116 may be any adjacent pair of scorelines 113 on the striking face 111. Vertical cross-section A-A' passes through the central region 119 of the striking face, including the first scoreline 114 and the second scoreline 116. In some embodiments, the vertical cross-section A-A' passes through the face center 117. In alternative embodiments, the vertical cross-section A-A' is laterally spaced from the face center 117. Vertical cross-section B-B' is laterally spaced from the vertical cross-section A-A' and passes through the peripheral portion 121 of the striking face 111, including passing through the first scoreline 114 and the second scoreline 116. As shown, vertical cross-section B-B' is toeward of the vertical cross-section A-A'. However, in alternative embodiments, the vertical cross-section B-B' is heelward of the vertical cross-section A-A'. Specifically, the vertical cross-section B-B' is laterally spaced from the vertical cross-section A-A' by a distance of 10 mm. However, in alternative embodiments, this distance is greater than, or less than, 10 mm.

FIG. 2(a)(1) illustrates a toe-side view of vertical cross-section A-A' that passes through the central region 119 of FIG. 2 of the golf club head 100. The striking face 111 is generally coplanar with the striking face plane 112. The striking face plane 112 defines a datum plane from which depth, including maximum depth, of each of the scorelines 113 and the auxiliary grooves 115 is measured. A highlighted region is illustrated by dashed lines for a detailed view that will be discussed in FIG. 2(a)(2).

Referring to FIG. 2(a)(2), which is a magnified view of the highlighted region of FIG. 2(a)(1), the first scoreline 114 and the second scoreline 116 are depicted. A lowermost point 118 of the first scoreline 114 is illustrated as being a point at which a lower edge of the first scoreline 114, the striking face plane 112 and the cross-section A-A' intersect. An uppermost point 120 of the second scoreline 116 is illustrated as being a point at which an upper edge of the second scoreline 116, the striking face plane 112 and the cross-section A-A' intersect. As shown, the cross-sectional profiles of the scoreline 116 may include a negatively-radiused region 160 and a positively-radiused region 162.

A first path 150 is formed along the striking face 111 by an intersection of the cross-section A-A' and the striking face 111, and between the lowermost point 118 of the first scoreline 114 and the uppermost point 120 of the second scoreline 116. A distance $\lambda_1$ of the first path 150 is illustrated between the lowermost point 118 of the first scoreline 114 and the uppermost point 120 of the second scoreline 116. Preferably, the distance between each pair of adjacent scorelines, in the cross-section A-A', is substantially uniform. However, in alternative embodiments, the distance separating each pair of adjacent scorelines varies. A distance $\omega_1$ is a width of a first of the auxiliary grooves 115. Preferably, a width of each auxiliary groove in the cross-section A-A' is substantially uniform. However, in alternative embodiments, such widths vary. A distance $\omega_2$ is a width of the second scoreline 116. Preferably, the width of each scoreline in cross-section A-A' is substantially uniform. However, in alternative embodiments, such widths vary.

A distance $d_1$ is a depth of one of the auxiliary grooves 115. Preferably, a depth of each of the auxiliary grooves shown in the cross-section A-A' is substantially uniform, i.e. within the range of typical tolerances associated with the material removal process used in its formation. However, in alternative embodiments, such depths vary. A distance $d_2$ is a depth of the second scoreline 116. Preferably, a depth of each scoreline shown in the cross-section A-A' is uniform. However, in alternative embodiments, such depths vary.

As used herein, the term "concentration" refers to the concentration of auxiliary grooves over a specified length in a specified vertical cross-section, and is determined as a ratio of the total sum of widths of all auxiliary grooves that traverse a specified segment of a specified vertical cross-section to the overall length of the specified segment of the specified vertical cross-section.

In the central region 119, e.g. in the cross-section A-A', the concentration of the plurality of auxiliary grooves 115 along the first path 150, in one or more embodiments, is no less than 0.12. However, in recognition of the specific interaction between an elastomeric-type golf ball and a metallic striking face, the concentration of the plurality of auxiliary grooves 115 along the first path 150 is more preferably between 0.17 and 0.25. However, in alternative embodiments, specifically where it is intended to provide a striking face having selectable spin characteristics dependent on the location of contact with a golf ball, the concentration may be less than 0.17 in areas intended to have reduced spin.

To further produce desired spin results, the average depth of the auxiliary grooves 115 in one embodiment is no greater than 15 microns. In another embodiment, the average depth of the auxiliary grooves 115 is no greater than 12 microns. In a further embodiment, the average depth of the auxiliary grooves 115 is between 6 microns and 12 microns.

Also, the average width of the auxiliary grooves 115 in some embodiments is no greater than 1.0 mm. In another embodiment, the width of the auxiliary grooves 115 is no greater than 0.5 mm. In still another embodiment, the average width of the auxiliary grooves is no greater than 0.25 mm. In another embodiment, the average width of the auxiliary grooves 115 is no greater than 0.20 mm. In a further embodiment, the average width of the auxiliary grooves 115 is between 0.12 mm and 0.18 mm.

A "frequency" of the plurality of auxiliary grooves, as used herein, refers to a number of all auxiliary grooves that traverse a specified path of a specified vertical cross-section of a striking face of a club head. Over the first path 150, in the cross-section A-A', a frequency of the auxiliary grooves 115 is preferably no less than 0.90 grooves/mm. More preferably, and in recognition of the specific dynamic interaction between an elastomeric-type golf ball and a metallic striking face, such frequency is no less than 1.00 grooves/mm. More preferably, such frequency is no less than 1.10 grooves/mm. In a further embodiment, such frequency is no more than 1.70 grooves/mm. As discussed below, increasing or decreasing auxiliary groove frequency outside of this range has a deleterious effect on desired ball spin. The frequency of the auxiliary grooves 115 may be constant or variable between any two adjacent scorelines of the plurality of scorelines 113 over the striking face 111 and in a single cross-section, e.g. cross-section A-A', or variable between multiple cross-sections spaced apart laterally. In other words, a first frequency between the same or different pair of scorelines 113 may be the same or different from a second frequency between the same or different pair of scorelines 113, depending on the location of a cross-section that is taken of the golf club head 100. Generally, however, a change in frequency would have an advantageous effect on the spin production in the case of alternative striking face 111 orientations.

With respect to the number of auxiliary grooves 115 between any two of the plurality of scorelines 113, in one embodiment, the number of auxiliary grooves 115 is no greater than five auxiliary grooves 115. In another embodiment, the number of auxiliary grooves 115 is no greater than four auxiliary grooves 115. In a further embodiment, the number of auxiliary grooves 115 is no less than three auxiliary grooves 115.

The following tables 1-1 and 1-2 illustrate collected performance data relating the frequency, concentration, and orientation of auxiliary grooves 115 to spin production using robot testing. Table 1-1 illustrates collected performance data comparing the auxiliary groove frequency and concentration of a golf club head 100, in a specified cross-section of a central region 119 of the striking face 111, the location of which being constant for each test club head, to the spin rate of the golf ball after impact.

TABLE 1-1

| | | Full shot | | Chip Shot | | |
| --- | --- | --- | --- | --- | --- | --- |
| Auxiliary Groove Frequency (#/mm) | Auxiliary Groove Concentration | Using Srixon Z-URS golf ball (rpm) | Using Srixon Soft Feel golf ball (rpm) | Using Srixon Z-URS golf ball (rpm) | Using Srixon Soft Feel golf ball (rpm) | Average Spin (rpm) |
| 0.993 | 0.149 | 9130 | 6126 | 4656 | 3094 | 5752 |
| 1.325 | 0.199 | 9133 | 6110 | 4876 | 4356 | 6119 |
| 1.656 | 0.248 | 9302 | 5458 | 4818 | 4067 | 5911 |
| 1.987 | 0.298 | 9449 | 3720 | 4987 | 3321 | 5369 |

FIG. 2(b)(1) illustrates a toe-side view of vertical cross-section B-B' that passes through the peripheral region 121 of FIG. 2 of the golf club head 100. The striking face plane 112 is illustrated and serves as a datum plane from which a depth of the scorelines 113 and the auxiliary grooves 115 is measured. A highlighted region is illustrated by dashed lines for a detailed view that will be discussed in FIG. 2(b)(2).

Referring to FIG. 2(b)(2), which is a magnified view of the highlighted region of FIG. 2(b)(1), the first scoreline 114 and the second scoreline 116 are depicted. A lowermost point 118 of the first scoreline 114 is illustrated as being a point at which a lower edge of the first scoreline 114, the striking face plane 112 and the cross-section B-B' intersect. An uppermost point 120 of the second scoreline 116 is illustrated as being a point at which an upper edge of the second scoreline 116, the striking face plane 112 and the cross-section B-B' intersect. A second path 123 is formed along the striking face 111 by an intersection of the cross-section B-B' and the striking face 111, the second path 123 delimited by the lowermost point 118 of the first scoreline 114 and the uppermost point 120 of the second scorelines 116. A distance $\lambda_2$ is illustrated between the lowermost point 118 of the first scoreline 114 and the uppermost point 120 of the second scoreline 116. A distance $\omega_1$ is a width of an auxiliary groove 115. A distance $\omega_2$ is a width of the second scoreline 116. A distance $d_1$ is a depth of the auxiliary grooves 115. A distance $d_2$ is a depth of the second scoreline 116. While distances $\omega_2$ and $d_2$ are illustrated with respect to the second scoreline 116, the first scoreline 114, or any other scoreline of the plurality of scorelines 113, may be of the same or a different value for its respective width and depth.

In one or more embodiments, the concentration, frequency, and/or number of auxiliary grooves 115 that occur between the first and second scorelines 114, 116 along the first path 150 (i.e. in the cross-section A-A') and the second path 123 (i.e. in the cross-section B-B') are different from one another. This variation in concentration causes the spin production to be different depending on the orientation of the golf club head 100 when impacting a golf ball, as discussed above. Specifically, a concentration of the auxiliary grooves that traverse the cross-section B-B' is preferably less than the concentration of auxiliary grooves traversing the cross-section A-A' in between the same first scoreline 114 and second scoreline 116. Specifically, such concentration is no greater than 0.18. More preferably, such concentration is between 0.05 and 0.18. Even more preferably, such concentration is between 0.12 and 0.16, most preferably substantially equal to 0.15.

Similarly, a frequency of all auxiliary grooves 115 traversing the second path 123 of the cross-section B-B' is less than the frequency of all auxiliary grooves 115 traversing the first path in the cross-section A-A'. Specifically, such frequency is preferably no greater than 1.30 grooves/mm. More preferably, such frequency is between 0.50 grooves/mm and 1.15 grooves/mm. Even more preferably, such frequency is between 0.85 grooves/mm and 1.05 grooves/mm, most preferably between 0.95 grooves/mm and 1.05 grooves/mm. Similarly, the simple number of auxiliary grooves that traverse the second path in the cross-section B-B' is less than the number that traverse the first path of cross-section A-A', and in some embodiments less than four.

Table 1-2 includes performance data of a first golf club head having a striking face with a plurality of scorelines but absent any auxiliary grooves, and a second golf club head identical to the first golf club head, but with auxiliary grooves following the pattern shown in FIGS. 1 and 2. The "Change in spin rate . . . " represents the measured change in backspin between a robot-tested shot with the club head square (i.e. a regular shot) and a robot-tested shot, at the same swing speed, with the club head oriented with a substantially open face (i.e. a flop shot). Once the striking face 111 is opened on a golf club head 100 having only scorelines 113, the amount of spin produced is 316 rpm less than that of the regular shot. However, for a golf club head 100 having the auxiliary grooves 115, in an angle-straight-angle orientation such as that illustrated in FIG. 1, the amount of spin that is produced in a flop shot actually increases by 23 rpm. Therefore, there is an improvement in spin production performance during a flop shot between a golf club head 100 having only scorelines 113 and a golf club head 100 having the auxiliary grooves 115 by 339 rpm.

TABLE 1-2

|  | Change in spin rate between regular shot and flop shot (rpm) |
|---|---|
| Standard club head having scorelines only | −316 |
| Standard club head having scorelines with auxiliary groove pattern of FIGS. 1 and 2 | 23 |

Figure 3:
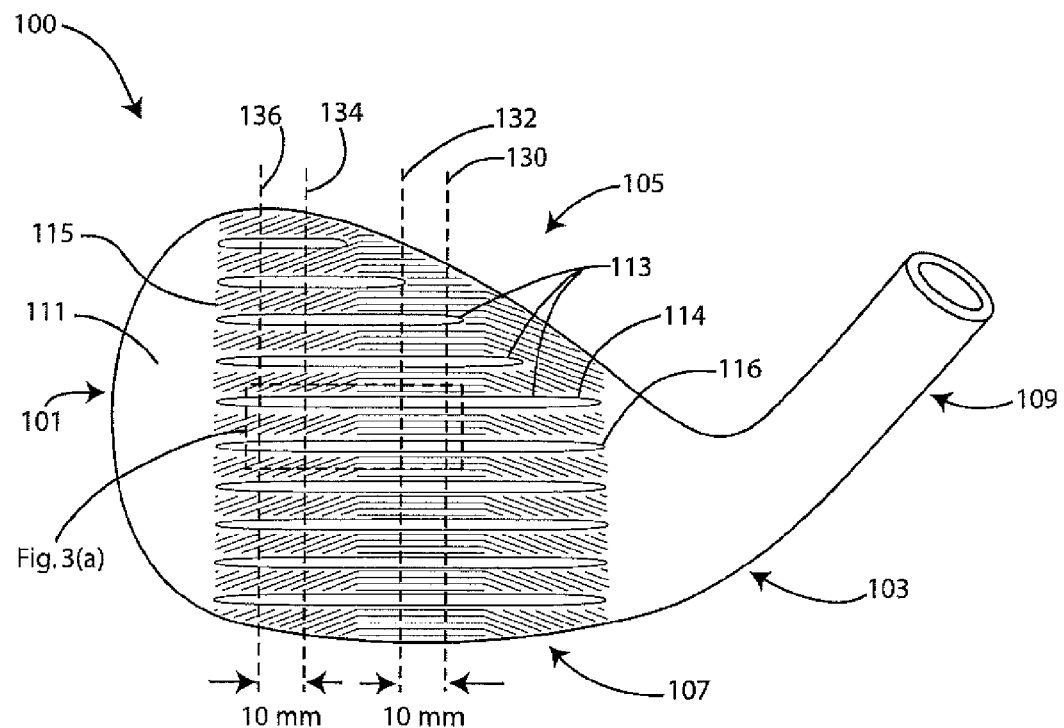
FIG. 3 is a view of a golf club head according to FIG. 2 with a striking face plane in the plane of the paper.

FIG. 3 illustrates the golf club head 100 of FIGS. 1 and 2, oriented such that the striking face plane 112 lies in the plane of the paper, and showing further detail. First, second, third and fourth imaginary vertical planes 130, 132, 134, and 136 each pass through a portion of the striking face 111, and pass through a portion of the plurality of scorelines 113. The first and second imaginary planes 130 and 132 are spaced by 10 mm from one another. The third and fourth imaginary planes 134 and 136 are also spaced 10 mm from one another, both located toeward of both the first and second imaginary vertical planes 130 and 132. A highlighted region is also illustrated as a selection for viewing in greater detail in FIG. 3(a).

Figure 3A:
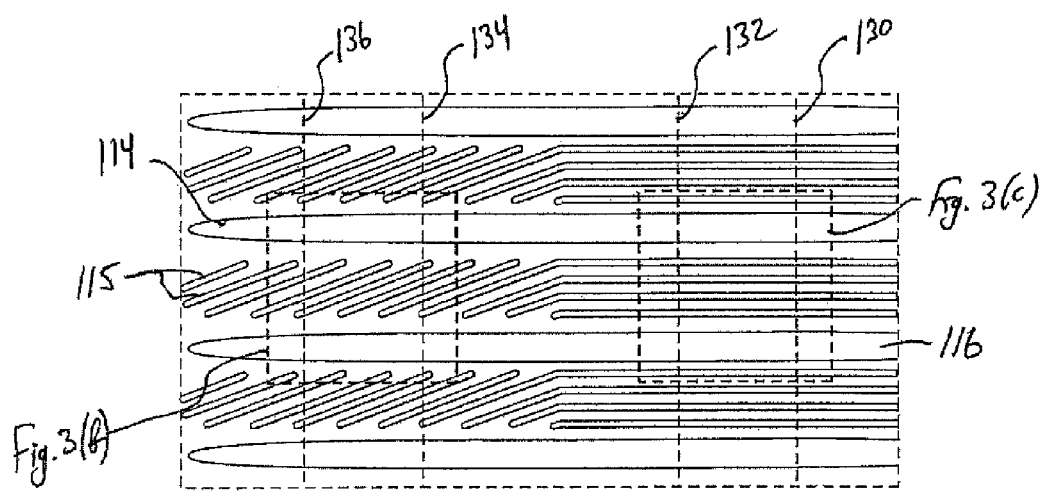
FIG. 3(a) is a detail view of a portion of the golf club head of FIG. 3.

FIG. 3(a) illustrates the highlighted portion of FIG. 3 such that the view is zoomed in on a portion of the striking face 111 with the first scoreline 114, the second scoreline 116 and the auxiliary grooves 115 in view. First, second, third and fourth imaginary planes 130, 132, 134, and 136 are also illustrated. Highlighted selections for illustrating in greater detail in FIGS. 3(b) and 3(c) are illustrated by respective dashed lines.

FIG. 3(b) illustrates a magnified view of the portion highlighted in FIG. 3(a), showing how average concentration of the plurality of auxiliary grooves 115, between the first and second scorelines 114 and 116, and between the third and fourth imaginary vertical planes 134 and 136, is to be measured. As used herein, "average concentration" of a plurality of auxiliary grooves, e.g. auxiliary grooves 115, refers to an average of a plurality of concentration measurements taken at 1 mm intervals between specified first and second imaginary vertical planes, and between specified first and second scorelines that are adjacent to each other.

Accordingly, to determine the average concentration of the plurality of auxiliary grooves 115 between the first scoreline 114 and the second scoreline 116, and between the third imaginary vertical plane 134 and the fourth imaginary vertical plane 136 (see FIG. 3(b)), concentration measurements are taken at 1 mm intervals, such that $l_0$ is taken along the fourth imaginary vertical plane 136 and each successive concentration measurement, $l_1, l_2 \ldots l_0$, is taken at 1 mm intervals thereafter and until the third imaginary vertical plane 134 is reached.

An exemplary concentration measurement is taken at $l_5$ and in the cross-section C-C'. FIG. 3(b)(1) is a toe-side view of the cross-section C-C' illustrating the first scoreline 114 and the second scoreline 116 having three auxiliary grooves, of the plurality of auxiliary grooves 115, that traverse this particular cross-section. The widths of the traversing auxiliary grooves are illustrated by $\omega_3$, $\omega_4$ and $\omega_5$. The cross-section C-C' is taken at a position where the distance between the first and second scorelines 114 and 116 is $l_5$. Accordingly, a concentration of the auxiliary grooves 115 at cross-section C-C' is calculated as $(\omega_3+\omega_4+\omega_5)/l_5$. The average concentration of auxiliary grooves 115 in the region delimited by the first scorelines 114, the second scoreline 116, the first imaginary vertical plane 130, and the second imaginary vertical plane 132, is measured in similar manner, as shown in FIG. 3(c)(1), wherein an exemplary concentration measurement $l_5$ is taken at vertical cross-section D-D'.

The average concentration of the plurality of auxiliary grooves 115 measured between the first scoreline 114 and the second scorelines 116, and between the third imaginary vertical plane 134 and the fourth imaginary vertical plane 136 (see FIG. 3(b)), is denoted by $C_2$. The average concentration of the plurality of auxiliary grooves 115 measured between the first scoreline 114 and the second scoreline 116, and between the first imaginary vertical plane 130 and the second imaginary vertical plane 132 (see FIG. 3(c)), is denoted as $C_1$.

Preferably, $C_1$ is no less than 0.15. More preferably, $C_1$ is between 0.18 and 0.25, most preferably equal to about 0.20. Preferably, $C_2$ is no greater than 0.20. More preferably, $C_2$ is between 0.12 and 0.18, and most preferably equal to about 0.15. Preferably, $C_1$ and $C_2$ are related in that $C_1$ is greater than $C_2$. More specifically, $C_1$ is preferably greater than $C_2$ by at least 0.25, more preferably at least 0.35. Alternatively, or in addition, a ratio of the concentrations $C_2/C_1$ is no greater than 0.85. In another embodiment, the ratio of concentrations $C_2/C_1$ is no greater than 0.80. In still a further embodiment, the ratio $C_2/C_1$ is between 0.70 and 0.80. Alternatively, or in addition, the face center 117 of the striking face 111 is located within the region delimited by the first scoreline 114, the second scoreline 116, the first imaginary vertical plane 130, and the second imaginary vertical plane 132.

Figure 4:
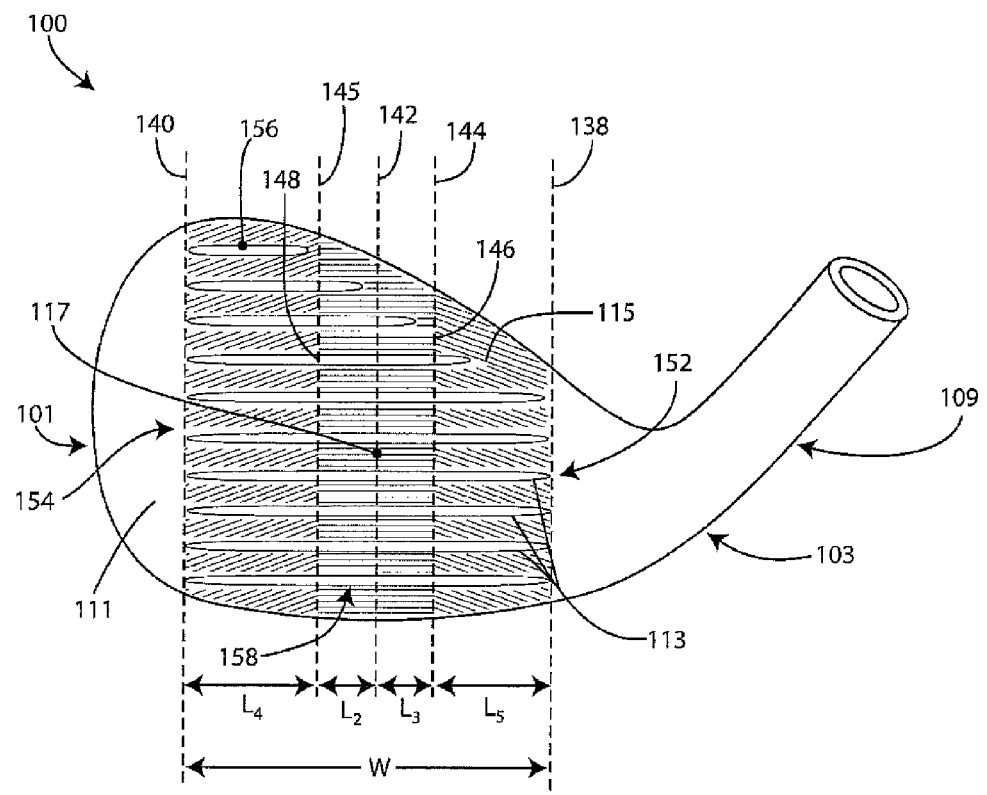
FIG. 4 is a front view of the golf club head of FIG. 3 with a striking face plane in the plane of the paper.

In FIG. 4, the golf club head 100 of FIG. 1 is shown illustrating further detail. As shown, the striking face plane 112 of the striking face 111 is in the plane of the paper. The plurality of scorelines 113 is located on the striking face 111. The plurality of scorelines 113 includes a heelwardmost extent 152, a toewardmost extent 154, an uppermost extent 156, and a lowermost extent 158. A fifth imaginary vertical plane 138 is perpendicular to the striking face plane 112 and passes through the heelwardmost extent 152 of the plurality of scorelines 113. A sixth imaginary vertical plane 140 is perpendicular to the striking face plane 112 and passes through the toewardmost extent 154 of the plurality of scorelines 113. A seventh imaginary vertical plane 142 is perpendicular to the striking face plane 112 and passes through the face center 117. The plurality of auxiliary grooves 115 are also located on the striking face 111 and, in some embodiments, entirely spaced from the plurality of scorelines 113. By entirely spacing the auxiliary grooves 115 from the scorelines 113, the auxiliary grooves 115 will not interfere with the traction-enabling structure of the scorelines 113 nor will the auxiliary grooves 115 interfere with the structural integrity of the scorelines. Specifically, such spacing prevents unintended generation of stress areas about the edges of the scorelines and/or unintended sharp regions that are susceptible to wear. In the alternative, such spacing reduces the need for further grinding and/or polishing about the edges of the scorelines 113, which may, in its own right, increase production costs, reduce design accuracy, and deleteriously affect the traction-enabling benefit of the scorelines 113.

The auxiliary grooves 115 define a first transition location 146 at which an auxiliary groove pattern transitions, e.g. from horizontal, spaced apart grooves to spaced apart grooves, proximate the heel portion 103 of the club head 100, inclined relative to the ground plane. At a second transition location 148, the auxiliary groove pattern again transitions from horizontal spaced apart grooves to spaced apart grooves, proximate the toe portion 101 of the club head 100, inclined relative to the ground plane. In some embodiments, either, or both, of the transition locations 146 and 148 lie at the intersection of the striking face plane 112 and a vertical plane perpendicular to the striking face plane 112. In alternative embodiments, either, or both, of the transition locations 146 and 148 lies along a linear path that is oblique relative to the direction of elongation of the scorelines 113. In alternative embodiments, either, or both, of the transition locations 146 and 148 follow a generally curvilinear path along the striking face plane 112.

An eighth imaginary vertical plane 144 is perpendicular to the striking face plane 112 and coplanar with the transition location 146. A ninth imaginary vertical plane 145 is perpendicular to the striking face plane 112 and coplanar with the transition location 148.

A width W of the plurality of scorelines 113 denotes the lateral distance between the heelwardmost extent 152 and the toewardmost extent 154 of the plurality of scorelines 113. The width W is preferably within the range of 35 mm to 65 mm, more preferably between 45 mm and 55 mm, and most preferably equal to about 50 mm. The fifth imaginary vertical plane 138 and the eighth imaginary vertical plane 144 are spaced apart by a distance $L_5$. The distance $L_5$ is preferably between 12 mm and 18 mm, more preferably equal to about 15 mm. The seventh imaginary vertical plane 142 and the eighth imaginary vertical plane 144 are spaced apart by a distance $L_3$. The distance $L_3$ is preferably between 6 mm and 14 mm, more preferably equal to about 10 mm. The seventh imaginary vertical plane 142 and the ninth imaginary vertical plane 145 are spaced apart by a distance $L_2$. The distance $L_2$ is preferably between 6 mm and 14 mm, more preferably equal to about 10 mm. The sixth imaginary vertical plane 140 and the ninth imaginary vertical plane 145 are spaced apart by a distance $L_4$. The distance $L_4$ is preferably between 12 mm and 18 mm, more preferably equal to about 15 mm.

In various embodiments, the seventh imaginary plane 142 is equidistant between the fifth imaginary plane 138 and the sixth imaginary plane 140. That is, $L_5+L_3=L_4+L_2$. Additionally, or alternatively, the eighth and ninth imaginary planes 144 and 145 are spaced from the seventh imaginary plane 142 by a distance D. In some embodiments, the distance D is preferably between 0.10*W and 0.45*W.

In various embodiments, a central region is delimited by the eighth imaginary vertical plane 144 and the ninth imaginary vertical plane 145, a heel region is delimited by the fifth imaginary vertical plane 138 and the eighth imaginary vertical plane 144, and a toe region is delimited by the sixth imaginary vertical plane 140 and the ninth imaginary vertical plane 145. In some embodiments, at least one of the auxiliary grooves 115 follows a generally horizontal path, relative to the ground plane within the central region.

Figure 5:
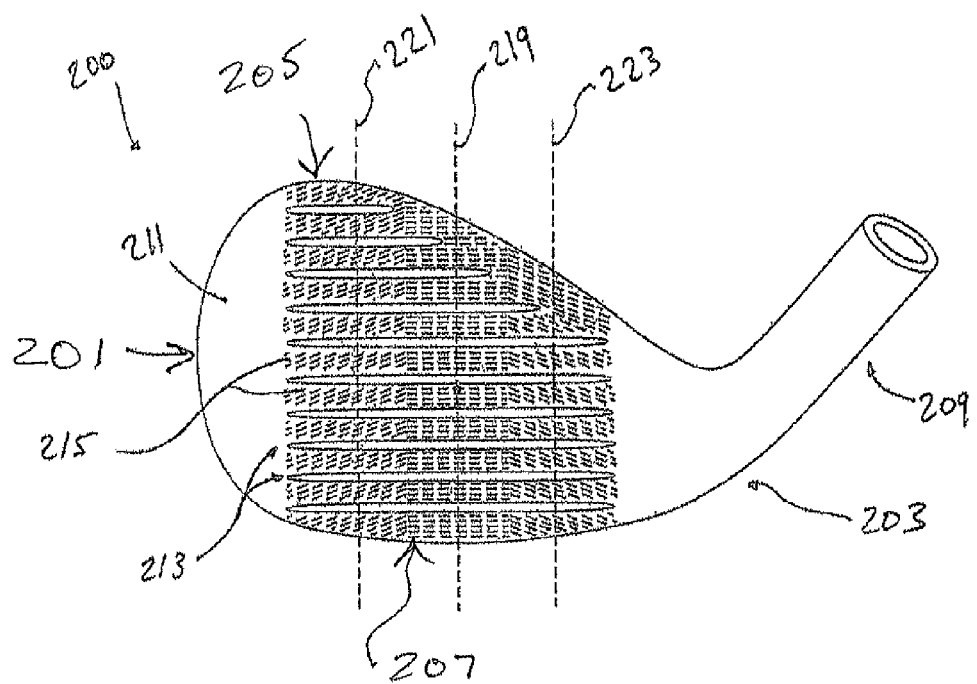
FIG. 5 is a front view of a golf club according to various embodiments with a striking face plane in the plane of the paper.

FIG. 5 illustrates a golf club head 200 that has a toe portion 201, a heel portion 203, a top portion 205, a bottom portion 207, and a hosel 209 proximate the heel portion 203. The golf club head 200 also has a striking face 211 that has a plurality of scorelines 213 and a plurality of texture elements, or auxiliary grooves, 215 interspersed between the plurality of scorelines 213. In this embodiment, the plurality of texture elements 215 are a series of discrete regions of applied surface texturing. As shown, the texture elements take the form of a set of "dash-like" elements. However, in alternative embodiments, the texture elements may include any polygonal shape, including circle-shaped elements, rectangular-shaped elements, square-shaped elements, triangular-shaped elements, hexagonal-shaped elements, or any combination thereof. Alternatively, or in addition, the texture elements include irregularly-shaped elements. Preferably, the texture elements 215 are formed by similar processes to those discussed with regard to the auxiliary grooves of the embodiment shown in FIG. 1. Particularly, the texture elements preferably comprise heat-treat regions, formed by a laser milling operation. Further, the texture elements preferably are of a depth similar to that of the auxiliary grooves 115 discussed with regard to the embodiments of FIGS. 1 through 4.

A first imaginary vertical plane 219 is illustrated as passing through a central region of the striking face 211. A second imaginary vertical plane 221 is illustrated as passing through a toeward region of the striking face 211. A third imaginary vertical plane 223 is illustrated as passing through a heelward region of the striking face 211. The texture elements 215 are generally horizontal in the central region. The texture elements 215 deviate from a horizontal orientation in each of the heelward and toeward regions, e.g. are inclined relative to a ground plane, in the striking face plane. Preferably, the texture elements 215 are configured such that they include frequency values, concentration values, and average concentration values that are similar to those values discussed with regard to the embodiment of FIGS. 1 and 2, as defined with regard to such embodiment, and at corresponding locations on the striking face.

Those skilled in the art will appreciate that while the present invention has been described in association with presently preferred aspects thereof, numerous changes, modifications and substitutions of equivalents may be made therein without departing from the spirit and scope of this invention which is intended to be unlimited by the foregoing except as may appear in the following appended claims.

What is claimed is:

1. A golf club head that, when oriented in a reference position relative to a ground plane, comprises:
   a heel portion;
   a toe portion opposite the heel portion;
   a hosel extending from the heel portion;
   a striking face having a striking face plane generally coplanar with the striking face;
   a plurality of scorelines including at least a first scoreline and a second scoreline adjacent the first scoreline; and
   a plurality of auxiliary, laser-milled grooves each interspersed between the plurality of scorelines and following an inclined path relative to the ground plane at an angle between 5 and 50 degrees relative to the horizontal, measured in the striking face plane.

2. The golf club head of claim 1, wherein a degree of incline of the plurality of auxiliary, laser-milled grooves varies with location on the striking face.

3. The golf club head of claim 1, wherein the plurality of auxiliary, laser-milled grooves comprises first grooves that have a continuously-variable degree of incline.

4. The golf club head of claim 3, wherein the first grooves each comprise a curved shape.

5. The golf club head of claim 1, wherein the angle of incline is between 5 and 20 degrees.

6. The golf club head of claim 1, wherein each of the plurality of auxiliary grooves has an average depth no greater than 15 microns.

7. The golf club head of claim 1, wherein:
   in a first imaginary vertical plane generally perpendicular to the striking face and passing through the first and second scorelines, a path is formed by an intersection between the first imaginary vertical plane and the striking face; and
   the plurality of auxiliary grooves has a frequency no less than 0.90 grooves/mm measured between the first and second scorelines.

8. The golf club head of claim 1, wherein:
   in a first imaginary vertical plane generally perpendicular to the striking face and passing through the first and second scorelines, a path is formed by an intersection between the first imaginary vertical plane and the striking face; and
   the plurality of auxiliary grooves has a frequency no greater than 1.7 grooves/mm measured between the first and second scorelines.

9. The golf club head of claim 1, wherein each of the plurality of auxiliary grooves has an average width no greater than 1.0 mm.

10. The golf club head of claim 1, wherein:
    the striking face comprises a textured surface region formed of a texture selected from the group consisting of: a media-blasted texture, a laser-peened texture, a milled texture, a chemically-etched texture, and a micro-milled texture; and
    the plurality of auxiliary grooves is at least partially superimposed on the textured region.

11. An iron-type golf club head that, when oriented in a reference position relative to a ground plane, comprises:
    a heel portion and a toe portion opposite the heel portion;
    a hosel extending from the heel portion; and
    a striking face having a striking face plane generally coplanar with the striking face; and
    a plurality of scorelines including at least a first scoreline and a second scoreline adjacent the first scoreline,
    wherein a first plurality of auxiliary, laser-milled grooves are interspersed between, and entirely spaced from, the plurality of scorelines, and follow an inclined path relative to the ground plane at an angle between 5 and 50 degrees relative to the horizontal, measured in the striking face plane.

12. The golf club head of claim 11, wherein a degree of incline of the plurality of auxiliary, laser-milled grooves varies with location on the striking face.

13. The golf club head of claim 11, wherein the plurality of auxiliary, laser-milled grooves comprises first grooves that have a continuously-variable degree of incline.

14. The golf club head of claim 13, wherein the first grooves each comprise a curved shape.

15. The golf club head of claim 11, wherein the angle of incline is between 5 and 20 degrees.

16. The golf club head of claim 11, wherein each of the plurality of auxiliary grooves has an average depth no greater than 15 microns.

17. The golf club head of claim 11, wherein:
    in a first imaginary vertical plane generally perpendicular to the striking face and passing through the first and second scorelines, a path is formed by an intersection between the first imaginary vertical plane and the striking face; and
    the plurality of auxiliary grooves has a frequency no less than 0.90 grooves/mm measured between the first and second scorelines.

18. The golf club head of claim 11, wherein:
    in a first imaginary vertical plane generally perpendicular to the striking face and passing through the first and second scorelines, a path is formed by an intersection between the first imaginary vertical plane and the striking face; and
    the plurality of auxiliary grooves has a frequency no greater than 1.7 grooves/mm measured between the first and second scorelines.

19. The golf club head of claim 11, wherein each of the plurality of auxiliary grooves has an average width no greater than 1.0 mm.

20. The golf club head of claim 11, wherein:
    the striking face comprises a textured surface region formed of a texture selected from the group consisting of: a media-blasted texture, a laser-peened texture, a milled texture, a chemically-etched texture, and a micro-milled texture; and the plurality of auxiliary grooves is at least partially superimposed on the textured region.

* * * * *